US010108605B1

(12) United States Patent
Leighton

(10) Patent No.: US 10,108,605 B1
(45) Date of Patent: Oct. 23, 2018

(54) NATURAL LANGUAGE PROCESSING SYSTEM AND METHOD

(71) Applicant: Pharm3r, New York, NY (US)

(72) Inventor: Greg Leighton, Hammonds Plains (CA)

(73) Assignee: PHARM3R LLC, New York, NY (US)

( * ) Notice: Subject to any disclaimer, the term of this patent is extended or adjusted under 35 U.S.C. 154(b) by 33 days.

(21) Appl. No.: 15/177,502

(22) Filed: Jun. 9, 2016

(51) Int. Cl.
*G06F 17/28* (2006.01)
*G06F 17/27* (2006.01)
*G06F 17/30* (2006.01)

(52) U.S. Cl.
CPC .......... *G06F 17/28* (2013.01); *G06F 17/2705* (2013.01); *G06F 17/277* (2013.01); *G06F 17/278* (2013.01); *G06F 17/30654* (2013.01); *G06F 17/30716* (2013.01)

(58) Field of Classification Search
CPC .... G06F 17/28; G06F 17/278; G06F 17/2705; G06F 17/30654; G06F 17/277; G06F 17/30716
USPC .......................................................... 704/9
See application file for complete search history.

(56) References Cited

U.S. PATENT DOCUMENTS

| 2006/0173674 | A1* | 8/2006 | Nakajima | ........... G06F 17/2715 704/9 |
| 2007/0244693 | A1* | 10/2007 | Atallah | ................. G06F 17/271 704/9 |
| 2013/0268290 | A1* | 10/2013 | Jackson | ................... G06F 19/28 705/2 |
| 2014/0059140 | A1* | 2/2014 | Auriemma | ........ G06F 17/30861 709/206 |
| 2016/0140090 | A1* | 5/2016 | Dale | .................... G06F 17/2235 715/205 |

* cited by examiner

*Primary Examiner* — Bharatkumar S Shah
(74) *Attorney, Agent, or Firm* — Polsinelli, PC

(57) ABSTRACT

Disclosed are systems and methods for natural language processing. The method includes receiving, by a first processor, a natural language input including a raw text document and a desired output request, defining an ordered sequence of natural language tasks based at least in part on the natural language input, and generating a data structure including the raw text document. The first processor can then transmit, to a second processor, the data structure and a request to execute a first natural language task in the ordered sequence, and the second processor can execute the first natural language task based at least in part on the data structure to produce a first task output. The second processor can then insert the first task output into the data structure and transmit the data structure having the first task output to the first processor. The first processor can then generate an output based at least in part on the data structure and the desired output request.

12 Claims, 7 Drawing Sheets

NATURAL LANGUAGE PROCESSING SYSTEM AND METHOD

TECHNICAL FIELD

The present technology pertains to natural language processing, and more specifically to natural language processing of unstructured text to extract desired information.

BACKGROUND

Organizations must often analyze massive volumes of unstructured or raw text to gather information and determine actionable items. For example, in the pharmaceuticals industry, it is desirable for organizations to detect references to product and manufacturer sentiment within large text databases, reports, and the like to develop strategic plans. To achieve such a task, organizations often rely on natural language processing (NLP) systems. However, current NLP systems fail to provide NLP-as-a-service in which a user can supply raw text data to a service endpoint and receive back a predetermined set of outputs. Moreover, current NLP systems are extremely inefficient, utilizing overly complex and redundant software on top of hardware that is incapable of efficiently scaling to meet demand.

SUMMARY

Embodiments of the invention concern natural language processing systems and methods. In a first embodiment of the invention a method includes receiving, by a first processor, a natural language input, the natural language input including a raw text document and a desired output request, defining, by the first processor, an ordered sequence of natural language tasks based at least in part on the natural language input, generating, by the first processor, a data structure, the data structure including the raw text document, transmitting, by the first processor and to a second processor, the data structure and a request to execute a first natural language task in the ordered sequence, executing, by the second processor, the first natural language task based at least in part on the data structure to produce a first task output, inserting, by the second processor, the first task output into the data structure, transmitting, by the second processor to the first processor, the data structure having the first task output, and generating, by the first processor, an output based at least in part on the data structure and the desired output request.

In one embodiment, the first processor is housed within a first computing node remotely located from the second processor housed within a second computing node.

In one embodiment, the first computing node and the second computing node comprise a node cluster, and wherein the first computing node is configured as a master node and the second computing node is configured as a slave node.

In one embodiment, the first processor and the second processor are located within a first computing node and are configured for multiprocessing.

In one embodiment, the first natural language task comprises one of a sentence segmentation, a word tokenization, a part of speech tagging, a named entity recognition, or a relation extraction.

In one embodiment, the data structure further comprises configuration options for one or more tasks within the ordered sequence of natural language tasks.

In one embodiment, the method further includes transmitting, by the first processor and to the second processor, the data structure having the first task output and a request to execute a second natural language task in the ordered sequence, executing, by the second processor, the second natural language task to produce a second task output, wherein the first task output serves as an input to the second natural language task, and inserting, by the second processor, the second task output into the data structure;

In one embodiment, the method further includes providing, by the first processor and to a user computing device, an application configured to display an interactive user interface for entering the natural language input.

In one embodiment, the method further includes transmitting, by the first processor and to the user computing device, the output, and displaying, by the application on the user computing device, an interactive visualization of the output.

In one embodiment, the output is transmitted as a JavaScript Object Notation (JSON) object.

In one embodiment, the raw text document comprises unstructured text pertaining to one or more of medical devices, drug brands, and drug compounds.

In another embodiment of the invention a method includes receiving, by a natural language processing (NLP) engine, a natural language input, the natural language input including a raw text document and a desired output request, defining, by the NLP engine, an ordered sequence of natural language tasks based at least in part on the natural language input, generating, by the NLP engine, a data structure, the data structure including the raw text document, executing, by the NLP engine, the first natural language task based at least in part on the data structure to produce a first task output, inserting, by the NLP engine, the first task output into the data structure, generating, by the NLP engine, an output based at least in part on the data structure and the desired output request.

In another embodiment of the invention, a system includes a natural language processing (NLP) engine, and a computer-readable storage medium having stored therein instructions which, when executed by the NLP engine, cause the NLP engine to perform operations including defining an ordered sequence of natural language tasks based at least in part on the natural language input, generating a data structure, the data structure including the raw text document, executing the first natural language task based at least in part on the data structure to produce a first task output, inserting the first task output into the data structure, generating an output based at least in part on the data structure and the desired output request.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
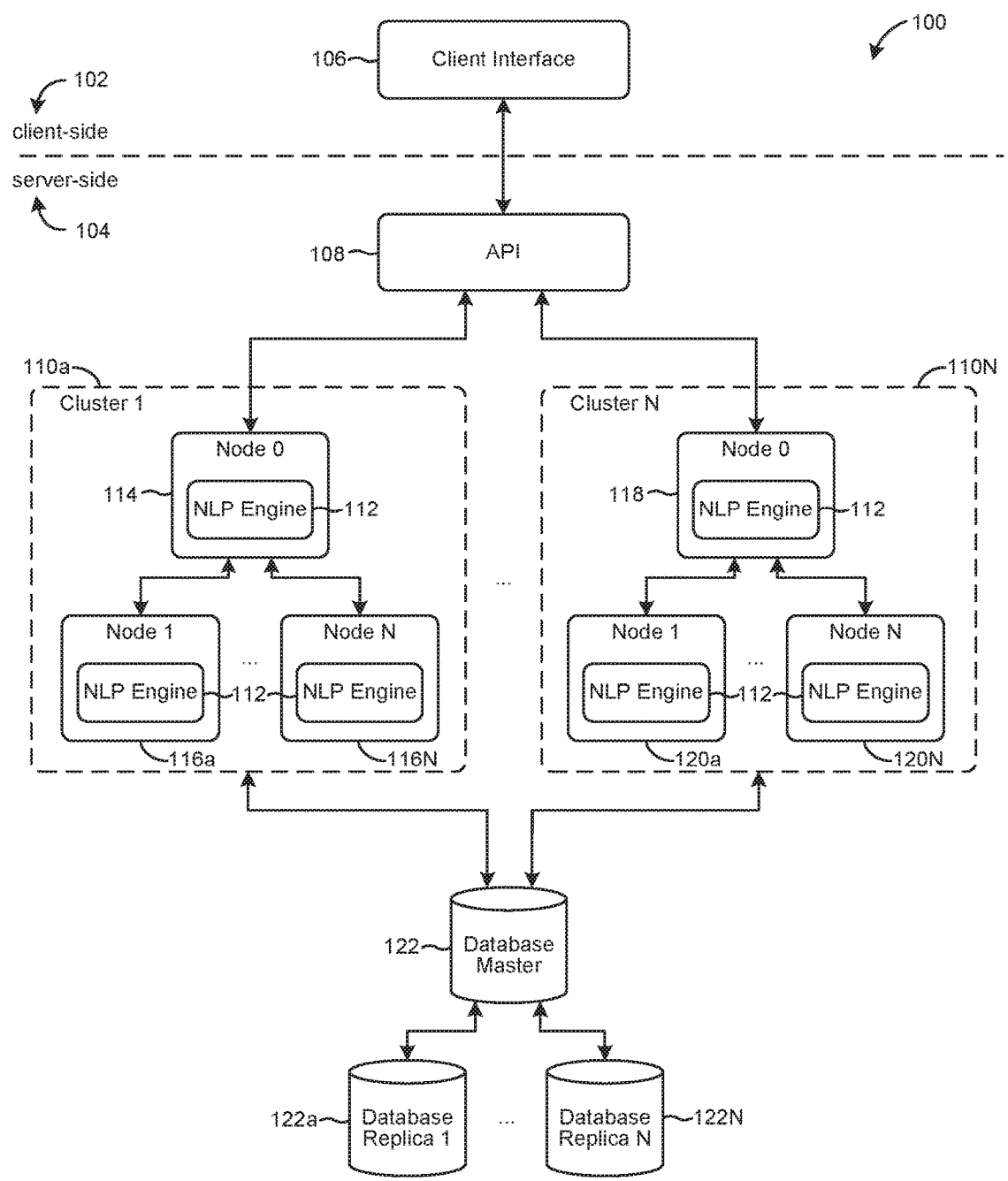
FIG. 1 illustrates a schematic diagram of an exemplary natural language processing system.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

As used herein, communicatively coupled is taken to mean any data transmission link between two or more computing devices or components, wired or wireless. Examples of such data transmission links include, but are not limited to, a Local Area Network (LAN), a Wide Area Network (WAN), Intranet, Internet, or any other wired or wireless networking and data transmission technologies that are known in the art.

The disclosed natural language processing (NLP) system and method are best understood in the context of the environment in which they operate. Accordingly, FIG. 1 depicts an illustrative architecture of a NLP system 100. Broadly, the NLP system architecture may be broken down into two constituent components: a client-side 102 and a server-side 104, the separation between the two demarcated in FIG. 1 by a horizontal dashed line. In some embodiments, client-side 102 may be referred to as a 'front-end' of NLP system 100, and server-side 104 may alternately be referred to as a 'back-end' of NLP system 100.

Client-side 102 consists of a client interface 106 which may be provided on one or more computing devices, such as computing devices 500 and 550 described with reference to FIGS. 5A and 5B, that are remote from server-side 104. In some embodiments, client interface 106 may be a mobile browser, a web application, a native application, a mobile application, an Application Programming Interface, or other interface capable of enabling communication between client-side 102 and server-side 104 as would be appreciated by one of ordinary skill in the art. Various examples of client interface 106 are provided, noting that client interface 106 need not have the same appearance or functionality for all users of NLP system 100. For example, some users may have restricted permissions or access to certain features of client interface 106; some users may access client interface 106 via a mobile application of a mobile computing device while other users may access client interface 106 via a web application of a desktop computing device; and some users may interact with multiple instances of client interface 106 simultaneously. As will be explained further, in some embodiments, client interface 106 may be designed to support a plurality of user instances and to execute on a variety of different platforms and client computing devices without any associated loss in functionality.

Server-side 104 may be provided on one or more computer servers that are communicatively coupled via one or more networks. The one or more computer servers may be housed in a single location or distributed over a plurality of different geographic locations and regions. In some embodiments, server-side 104 may be provided by one or more cloud computing clusters which allow for increased performance and greater reliability by permitting each instance of server-side 104 to execute on an optimal computing resource of the cloud computing clusters.

For instance, FIG. 1 illustrates server-side 104 containing an Application Programming Interface (API) 108 and one or more computing clusters 110a-110N, wherein N indicates the total number of computing clusters. Each of computing clusters 110a-110N can be predefined, such as by an administrator of NLP system 100, or can be dynamically defined, such as by API 108, a load balancer, or a controller (not shown) operating on server-side 104. Furthermore, two or more of the computing clusters 110a-110N may be communicatively coupled or otherwise operate in cooperation with each other.

Within each of computing clusters 110a-110N are two or more computing nodes, each node containing one or more processors running an instance of NLP engine 112. Each of computing clusters 110a-110N can include a single root node 114, 118 and one or more leaf nodes 116a-116N, 120a-120N. Moreover, each computing node within computing clusters 110a-110N can be designated as a master, a slave, or both a master and slave, where each slave node has a single master node from which it receives instructions and to which it returns results. For example, with reference to FIG. 1, root nodes 114, 118 can be designated as master nodes which send instructions to and receive results from slave nodes 116a-116N, 120a-120N, respectively. In this manner, a hierarchical tree structure is formed within each computing cluster 110a-110N which can be easily scaled as is known in the art.

Each of computing clusters 110a-110N can be further coupled to a shared database 122, wherein shared database 122 may comprise one or more networked storage devices functioning as a cohesive unit by virtue of a database controller. In some embodiments, each computing instance may be restricted to only transmit data to shared database 122 in order to provide increased security and reduce the probability of data being lost or otherwise compromised. In order to access information from shared database 122, server-side 104 may additionally contain one or more database read replicas 122a-122N, wherein each one of the database read replicas 122a-122N corresponds to a specific one of the computing clusters 110a-110N. Each database read replica may be an exact duplicate of shared database 122, or each database read replica may be dynamically populated by retrieving and saving data from shared database 122 as it becomes required by the corresponding computing cluster. In this manner, each of the computing clusters 110a-110N may be substantially isolated both from each other and from any specific hardware or computing resource that may be subject to a failure or security breach, thereby providing an increased degree of security and reliability to security system 100.

As illustrated in FIG. 1, API 108 can expose the services and resources provided on server-side 104, such as by computing clusters 110a-110N, to client interface 106 on client-side 102. For example, API 108 can utilize a set of routines, protocols, remote calls, data structures, object classes, and/or other tools to expose root nodes 114, 118 of computing clusters 110a-110N to client interface 106, thereby enabling data communications between client-side 102 and sever-side 104. In some embodiments, a separate component may be provided by server-side 104 in order to route the communications and data transmissions. To provide increased security, all communications between client-side 102 and server-side 104 may be encrypted or otherwise secured, regardless of whether the communications are handled by API 108 or a separate component. A username and associated password may be required in order for a user of NLP system 100 to access client interface 106, server-side 104, or both. Other network security policies may likewise be applied to the communication link between client-side 102 and server-side 104 in order to permit unauthorized access to security system 100, as would be appreciated by one of ordinary skill in the art.

In some embodiments, API 108 governs and controls the creation of the computing instances 110a-110N, wherein additional computing instances may be created, for example, in response to increased demand from client-side 102 or in order to achieve greater performance by increasing the ratio of computing instances to client-side requests. API 108 may also function to distribute each incoming request from client-side 102 to a specific one of the computing instances 110a-110N in accordance with a distribution metric that may be tailored to minimize power consumption, maximize performance, or some combination of the two. In some embodiments, all requests from a specific user of client interface 106 may be transmitted to the same computing instance according to the distribution metric of API 108.

In operation, a user (e.g., a person) of NLP system 100 on client-side 102 can submit a natural language input via client interface 106. Such an input can include, for example, one or more raw text documents and a request for a desired output. The raw text documents can include, but are not limited to, unstructured text pertaining to one or more of finance, insurance, pharma, medical devices, drug brands, drug compounds, and the like. The request can include a natural language query indicating a desired output from the one or more raw text documents, such as references to medical products including devices, drug brands, and drug compounds, manufacturer references, references to hospitals and medical research institutions, adverse event detection and linkage to specific medical products and manufacturers, product and manufacturer sentiment analysis, and the like. The request can be processed by API 108 and/or NLP engine 112 to determine the desired output. In some embodiments, the request can be predetermined, such as through a previous interaction between a user and NLP system 100, or can be selected from a list of keywords provided on client interface 106.

Figure 2A:
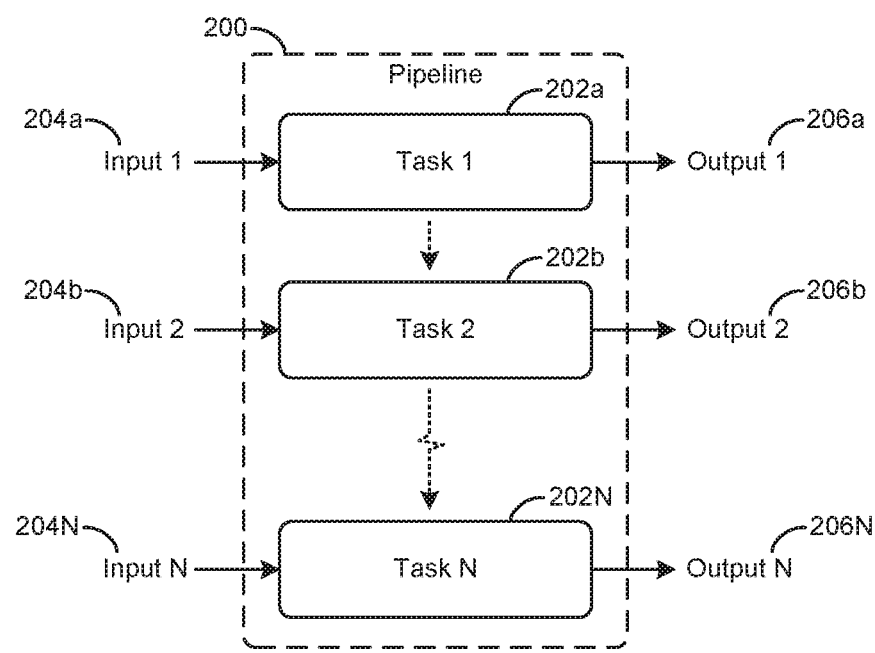
FIG. 2A illustrates a pipeline structure in accordance with the present disclosure.

Once the natural language input is submitted, API 108 or another component on server-side 104 can direct the input to NLP engine 112 on one or more root nodes 114, 118. From here, NLP engine 112 on root node 114, 118 can define an ordered sequence of NLP tasks necessary to process the natural language input and determine the desired output. The ordered sequence of NLP tasks, referred to herein as a pipeline, includes one or more individual NLP tasks to be executed in an ordered sequence. For instance, FIG. 2A depicts a pipeline 200 including a plurality of NLP tasks 202a-202N in an ordered sequence. The individual NLP tasks 202a-202N can be any NLP operation such as, but not limited to, sentence segmentation, word tokenization, part of speech tagging, named entity recognition, or relation extraction. As illustrated, each NLP task 202a-202N in pipeline 200 is provided with one or more inputs 204a-204N and produces one or more outputs 206a-206N. In many cases (but not always), the input to a particular task in a pipeline will be the output of the previous task in the pipeline. For example, output 206a of NLP task 202a can be provided as input 204b to NLP task 202b. Prior knowledge of these dependencies can encoded within the design of NLP engine 212, greatly reducing the number of lines of code required to execute common sequences of NLP operations.

After determining the ordered sequence of NLP tasks that comprise the pipeline, root node 114, 118 can generate blade data structure for defining the initial input to the pipeline, sharing intermediate inputs and outputs between tasks in the pipeline, and returning the ultimate pipeline output(s) to the initiator of the pipeline execution. The blade data structure can also include configuration options for each pipeline task, such as a choice of a specific task implementation, or use of a specified task model. In some embodiments, root node 114, 118 can delegate the responsibilities of generating the pipeline or blade data structure to one or more nodes under its domain, such as nodes 116a-116N, 120a-120N.

Figure 2B:
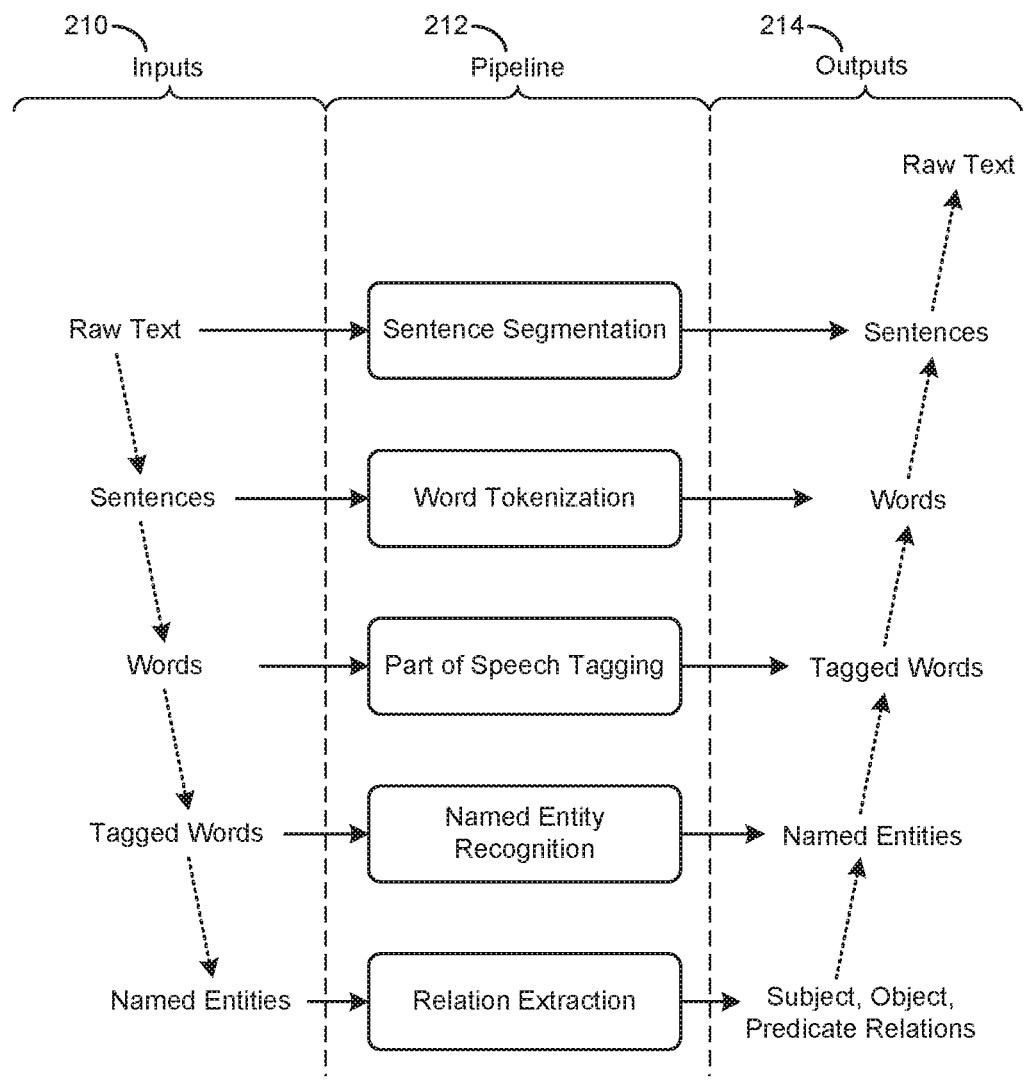
FIG. 2B illustrates an exemplary pipeline in accordance with the present disclosure.

FIG. 2B illustrates a specific example of a pipeline 212 in accordance with the present disclosure. As illustrated, the initial input 210 to pipeline 212 is a raw text sequence, such as the raw text documents received as part of the natural language input. The raw text is added to the generated blade as a first property. The first task in pipeline 212, sentence segmentation, is then executed and the output 214—a list of sentences—is added to the blade as a second property. The next pipeline task, word tokenization, reads this list of sentences from the blade, splits each sentence into constituent words, and stores the result on the blade. Execution proceeds in a similar manner until all five pipeline tasks have been completed, at which point the blade contains the following properties: text (the original raw text), sentences (e.g., a list of sentences extracted from the raw text), words (e.g., a "list of lists" containing the individual words from each sentence), tagged_words (e.g., a "list of lists" where inner list elements are <word, tag> tuples), named_entities (e.g., a "list of lists" where elements of the i-th inner list are named entities extracted from the i-th sentence) and relation extraction (e.g., a "list of lists" where elements of the i-th inner list are <subject, object, predicate> triples extracted from the i-th sentence). Once pipeline execution finishes, the properties in the blade can be stored, such as on database 120, and/or returned to a user at client interface 106. In some embodiments, the properties in the blade can be further processed (e.g., by one or more of computing clusters 110a-110N, at client interface 106, etc.) to produce an interactive visualization of the output for display on client interface 106.

To ensure efficient execution of pipeline tasks and to create a scalable NLP system 100, a master node, such as root nodes 114, 118, can partition a pipeline and delegate one or more tasks to registered slave nodes, such as nodes 116a-116N, 120a-120N, for execution in parallel. Moreover, master nodes can leverage multiprocessing by delegating one or more pipeline tasks to specific processors within its own node or its registered slave nodes. These implementations not only provide improvements to NLP processing techniques, but also improve the functioning of the computer itself.

Figure 3:
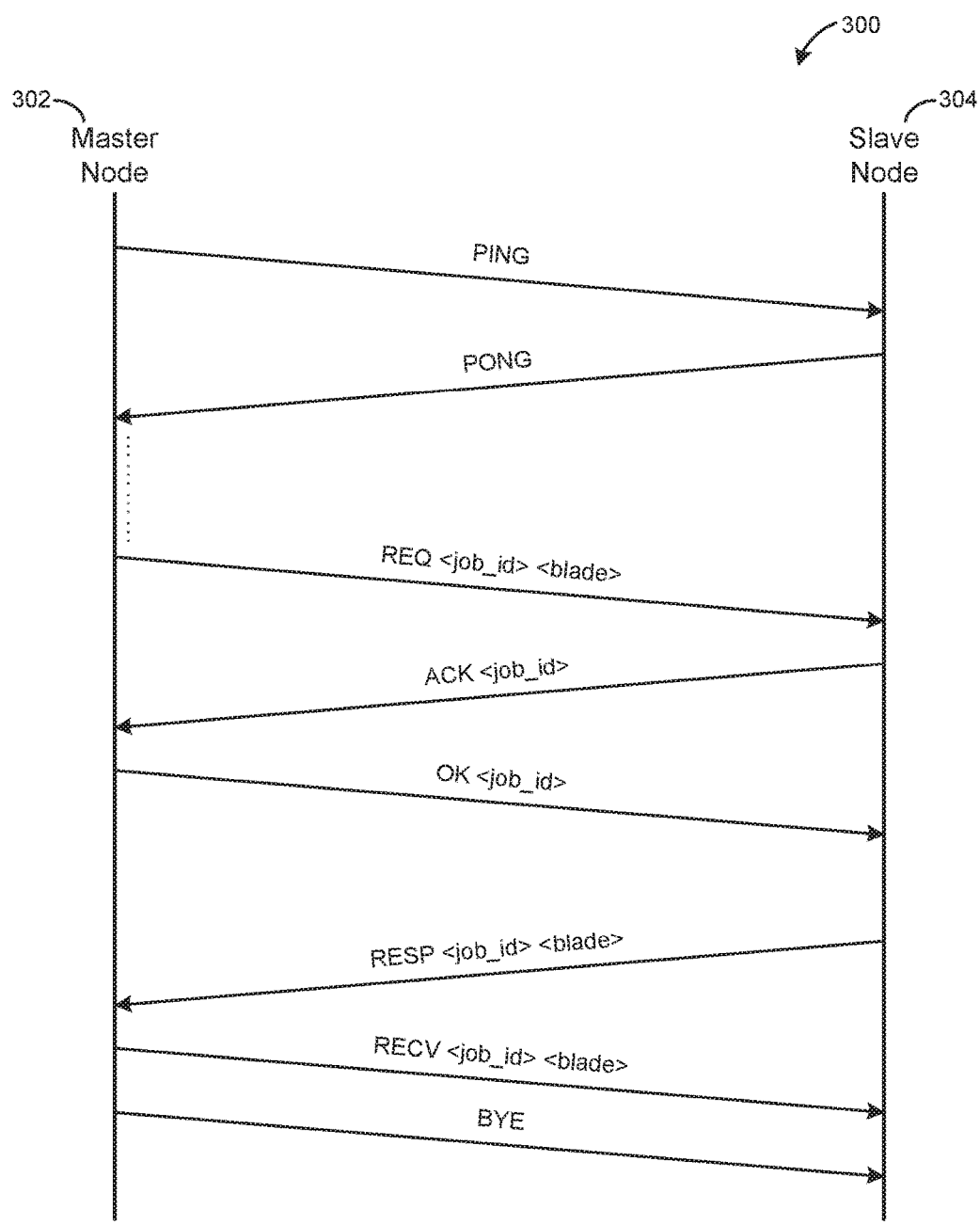
FIG. 3 illustrates an exemplary communication protocol between nodes in a computing cluster.

To do so, the nodes within NLP system 100 can utilize the communication protocol illustrated in FIG. 3. A master node can periodically send a PING message to a slave node to test that the node is still active and accessible. Upon receipt of a PING message, the slave node can respond with a PONG message to affirm to the master node that it is still active and accessible. To delegate a task in a pipeline, the master node can send a REQ <job_id><blade> message to a slave node to request that the node execute a specified pipeline task(s), indicated by job_id, using the supplied blade as an input. The slave node can respond with a ACK <job_id> message to the master to acknowledge receipt of the REQ message with the matching <job_id> and to indicate that it is able to fulfill the request. After receiving the ACK message, the master node can response with an OK <job_id> message to the slave node to acknowledge receipt of the ACK message with the matching <job_id>.

After executing the specific pipeline task(s), the slave node can send a RESP <job_id><blade> to the master master once the designated <job_id>. The attached blade can contain the output of the slave node's pipeline execution appended to the original received blade. The master node can subsequently response with a RECV <job_id> message to the slave node to acknowledge receipt of the RESP message with the matching <job_id>. Finally, the master node can send a BYE message to the slave node to indicate a pending shutdown. On receipt, the slave node closes the connection with its master node.

The sequence of REQ, ACK, and OK messages constitutes a 3-way handshake between the master node and the slave node. Successful completion of the handshake forms a contract stipulating that the slave node is able to fulfill the requested operation. An ERR message (e.g., ERR <job_id><error_message>) may be sent in place of an ACK or OK message if the master node or slave node cannot proceed with the agreement for any reason (e.g., if the requested pipeline is not registered with the slave, or if the master node decides to shutdown before the request can be completed by the slave). If neither an ACK, OK or ERR message is received before a designated timeout period, the sender node will attempt to re-send the ACK or OK message. If no response is received after a predetermined number of retries, the sender node can give up and take remedial action. For example, in the case of a master node failing to receive an ACK message, the request can be sent to a different slave node when applicable. In the case of a slave node failing to receive an OK message from master node, the slave node can abort processing of the request.

To prompt execution of a pipeline for a given natural language input, a user of client interface 106 can invoke API 108 through techniques known in the art. As a non-limiting example, API 108 can utilize representational state transfer (REST) to expose a Hypertext Transfer Protocol (HTTP) port on root nodes 114, 118 to client interface 106 and enable the commands outlined in Table 1.

TABLE 1

Exemplary List of Acceptable API Commands

| Command | Description |
| --- | --- |
| GET/ | Displays an HTML page with API documentation, including usage instructions for the other API endpoints and a listing of executable pipelines. |
| GET/list_tasks | Returns a list of the tasks registered within a root node's NLP engine. |
| GET/list_pipelines | Returns a list of the pipelines registered within a root node's NLP engine. |
| POST/execute | Initiates a pipeline execution over a single input. The request body should consist of an object with the following properties: pipeline_name: a string indicating the name of the pipeline to be executed. blade: an object containing props and options properties, defining the properties and configuration options, respectively, of the input blade. |
| POST/execute_batch | Initiates a separate pipeline execution for each element in a list of inputs. The request body should consist of an object with the following properties: pipeline_name: a string indicating the name of the pipeline to be executed. blade: an object containing props and options properties, defining the properties and configuration options, respectively, of the input blade. |

To facilitate a better understanding of the present disclosure, the following example of certain aspects of the present disclosure is given. In no way should the following example be read to limit, or define, the scope of the disclosure.

EXAMPLE

The present example demonstrates execution of a pipeline consisting of the following ordered sequence of tasks: sentence segmentation, word tokenization, part-of-speech tagging, and named entity recognition. The example operates over the raw text input show in Table 2.

TABLE 2

Exemplary Raw Text Input

In England, there was scarcely an amount of order and protection to justify much national boasting. Daring burglaries by armed men, and highway robberies, took place in the capital itself every night.

Execution of the example pipeline begins by initializing a blade data structure with the raw text input along with configuration options. In this example, the blade initially contains the settings shown in Table 3:

TABLE 3

Exemplary Initialized Blade Data Structure

```
{
  "props": {
    "text": text
  },
  "options": {
    "enable_multiprocessing": true,
    "named_entity_recognition": {
      "implementation": "MaxEntropy"
    },
    "sentence_segmentation": {
      "language": "English"
    }
}
```

TABLE 3-continued

Exemplary Initialized Blade Data Structure

```
    }
  }
```

In Table 3, the 'text' property is set to refer to the raw text input identified in Table 1. The 'options' section provides one example of a global option (i.e., an option applying across all tasks in the pipeline) indicating that multiprocessing mode should be leveraged to split execution across available processors on the local computing node. The 'options' section also contains two examples of local options (i.e., options applying to a specific task within the pipeline): (1) the sentence segmentation task should apply the English language model, and (2) the named entity recognition task should use the implementation based on the maximum entropy method.

After initialization, the blade data structure in Table 3 can be provided as an input to the first task in the pipeline (i.e., sentence segmentation). Once the sentence segmentation task is completed, the task output(s) are added to the blade data structure as shown in Table 4:

TABLE 4

Exemplary Output Blade Data Structure after Sentence Segmentation

```
{
  "props": {
    "text": text,
    "sentences": ['In England, there was scarcely an amount of order and protection to justify much national boasting.', 'Daring burglaries by armed men, and highway robberies, took place in the capital itself every night.']
  },
  "options": {
    "enable_multiprocessing": true,
    "named_entity_recognition": {
      "implementation": "MaxEntropy"
    },
    "sentence_segmentation": {
      "language": "English"
    }
  }
}
```

The output blade data structure produced by execution of the sentence segmentation task can be provided as an input blade for the next task in the pipeline (i.e., word tokenization). The following Tables 5-7 illustrate the addition of extra properties to the blade once each ordered task in the pipeline completes its execution, representing the task output(s).

TABLE 5

Exemplary Output Blade Data Structure after Word Tokenization

```
{
  "props": {
    "text": text,
    "sentences": ['In England, there was scarcely an amount of order and protection to justify much national boasting.', 'Daring burglaries by armed men, and highway robberies, took place in the capital itself every night.'],
    "words": [['In', 'England', ',', 'there', 'was', 'scarcely', 'an', 'amount', 'of', 'order', 'and', 'protection', 'to', 'justify', 'much', 'national', 'boasting', '.'], ['Daring', 'burglaries', 'by', 'armed', 'men', ',', 'and', 'highway', 'robberies', ',', 'took', 'place', 'in', 'the', 'capital', 'itself', 'every', 'night', '.']]
  },
  "options": {
    "enable_multiprocessing": true,
    "named_entity_recognition": {
```

TABLE 5-continued

Exemplary Output Blade Data Structure after Word Tokenization

```
      "implementation": "MaxEntropy"
    },
    "sentence_segmentation": {
      "language": "English"
    }
  }
}
```

TABLE 6

Exemplary Output Blade Data Structure after Part-of-Speech Tagging

```
}
  "props": {
    "text": text,
    "sentences": ['In England, there was scarcely an amount of order and protection to justify much national boasting.', 'Daring burglaries by armed men, and highway robberies, took place in the capital itself every night.'],
    "words": [['In', 'England', ',', 'there', 'was', 'scarcely', 'an', 'amount', 'of', 'order', 'and', 'protection', 'to', 'justify', 'much', 'national', 'boasting', '.'], ['Daring', 'burglaries', 'by', 'armed', 'men', ',', 'and', 'highway', 'robberies', ',', 'took', 'place', 'in', 'the', 'capital', 'itself', 'every', 'night', '.']],
    "tagged_words": [[('In', 'IN'), ('England', 'NNP'), (',', ','), ('there', 'EX'), ('was', 'VBD'), ('scarcely', 'RB'), ('an', 'DT'), ('amount', 'NN'), ('of', 'IN'), ('order', 'NN'), ('and', 'CC'), ('protection', 'NN'), ('to', 'TO'), ('justify', 'VB'), ('much', 'JJ'), ('national', 'JJ'), ('boasting', 'NN'), ('.', '.')], [('Daring', 'VBG'), ('burglaries', 'NNS'), ('by', 'IN'), ('armed', 'VBN'), ('men', 'NNS'), (',', ','), ('and', 'CC'), ('highway', 'NN'), ('robberies', 'NNS'), (',', ','), ('took', 'VBD'), ('place', 'NN'), ('in', 'IN'), ('the', 'DT'), ('capital', 'NN'), ('itself', 'PRP'), ('every', 'DT'), ('night', 'NN'), ('.', '.')]]
  },
  "options": {
    "enable_multiprocessing": true,
    "named_entity_recognition": {
      "implementation": "MaxEntropy"
    },
    "sentence_segmentation": {
      "language": "English"
    }
  }
}
```

TABLE 7

Exemplary Output Blade Data Structure after Named Entity Recognition

```
{
  "props": {
    "text": text,
    "sentences": ['In England, there was scarcely an amount of order and protection to justify much national boasting.', 'Daring burglaries by armed men, and highway robberies, took place in the capital itself every night.'],
    "words": [['In', 'England', ',', 'there', 'was', 'scarcely', 'an', 'amount', 'of', 'order', 'and', 'protection', 'to', 'justify', 'much', 'national', 'boasting', '.'], ['Daring', 'burglaries', 'by', 'armed', 'men', ',', 'and', 'highway', 'robberies', ',', 'took', 'place', 'in', 'the', 'capital', 'itself', 'every', 'night', '.']],
    "tagged_words": [[('In', 'IN'), ('England', 'NNP'), (',', ','), ('there', 'EX'), ('was', 'VBD'), ('scarcely', 'RB'), ('an', 'DT'), ('amount', 'NN'), ('of', 'IN'), ('order', 'NN'), ('and', 'CC'), ('protection', 'NN'), ('to', 'TO'), ('justify', 'VB'), ('much', 'JJ'), ('national', 'JJ'), ('boasting', 'NN'), ('.', '.')], [('Daring', 'VBG'), ('burglaries', 'NNS'), ('by', 'IN'), ('armed', 'VBN'), ('men', 'NNS'), (',', ','), ('and', 'CC'), ('highway', 'NN'), ('robberies', 'NNS'), (',', ','), ('took', 'VBD'), ('place', 'NN'), ('in', 'IN'), ('the', 'DT'), ('capital', 'NN'), ('itself', 'PRP'), ('every', 'DT'), ('night', 'NN'), ('.', '.')]],
    "named_entities": [[('England', 'GPE')], [('Captain', 'GPE'), ('Lord', 'ORGANIZATION'), ('London', 'GPE'), ('Turnham Green', 'PERSON'), ('London', 'GPE'), ('Court', 'ORGANIZATION'), ('St. Giles', 'GPE')], [('Newgate', 'ORGANIZATION'), ('Westminster Hall', 'ORGANIZATION')]],
    "named_entities_trees": [Tree('S', [('In', 'IN'), Tree('GPE', [('England', 'NNP')]), (',', ','), ('there', 'EX'), ('was', 'VBD'), ('scarcely', 'RB'), ('an', 'DT'), ('amount', 'NN'), ('of', 'IN'), ('order', 'NN'), ('and', 'CC'), ('protection', 'NN'), ('to', 'TO') , ('justify', 'VB'), ('much', 'JJ'),
```

TABLE 7-continued

Exemplary Output Blade Data Structure after Named Entity Recognition ('national', 'JJ'), ('boasting', 'NN'), ('.', '.')]), Tree('S', [('Daring', 'VBG'),
('burglaries', 'NNS'), ('by', 'IN') , ('armed', 'VBN'), ('men', 'NNS'), (',', ','),
('and', 'CC'), ('highway', 'NN'), ('robberies', 'NNS'), (',', ','), ('took',
'VBD'), ('place', 'NN'), ('in', 'IN'), ('the', 'DT'), ('capital', 'NN'), ('itself',
'PRP'), ('every', 'DT'), ('night', 'NN'), ('.', '.')])]
},
"options": {
 "enable_multiprocessing": true,
 "named_entity_recognition": {
  "implementation": "MaxEntropy"
 },
 "sentence_segmentation": {
  "language": "English"
 }
}
}

Figure 4:
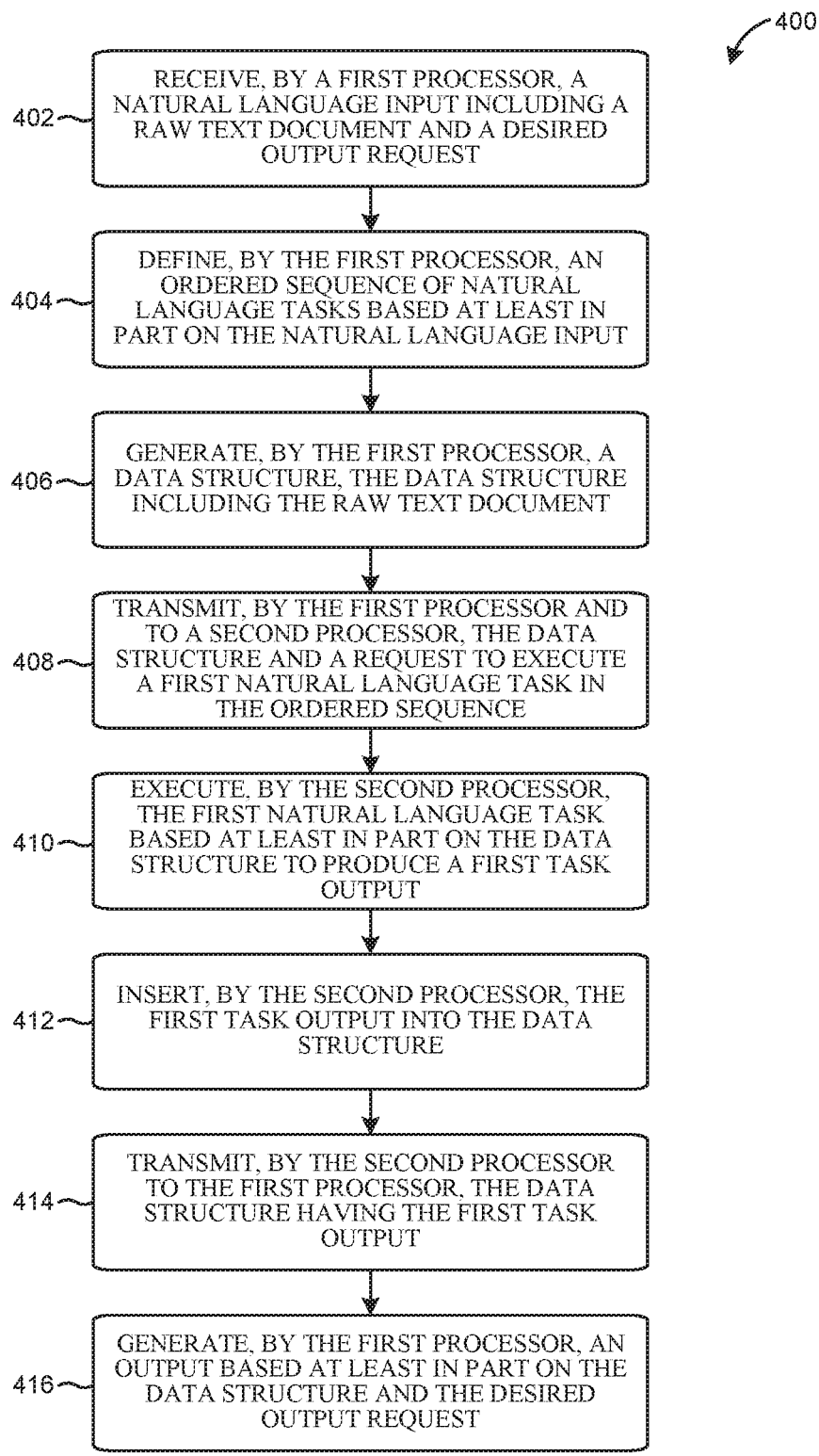
FIG. 4 illustrates an exemplary method embodiment.

Having described some basic system components and concepts, the disclosure now turns to a specific implementation of the present NLP system described through the exemplary method embodiment 400 shown in FIG. 4. For the sake of clarity, method 400 is described in terms of NLP system 100 as shown in FIG. 1. The steps outlined herein can be implemented in any combination thereof, including combinations that exclude, add, or modify certain steps.

Method 400 begins by receiving, on a first processor, a natural language input including a raw text document and a desired output request (step 402). The first processor can be a root and/or master node in NLP system 100, such as root nodes 114, 118. Also, the natural language input can be received via API 108 from a user operating on client interface 106.

At step 404, the first processor can define an ordered sequence of natural language tasks (e.g., a pipeline) based at least in part on the natural language input. The tasks, as well as the order of the tasks, can be selected from a predefined list in NLP system 100 or can be custom defined based on requirements of the natural language input. After defining the ordered sequence, the first processor can generate a data structure (e.g., a blade) including the raw text document and can store the generated data structure in database 120 (step 406).

At step 408, the first processor can transmit the data structure and a request to execute a first natural language task in the ordered sequence to a second processor. The second processor can be a processor within a slave node, such as nodes 116a-116N, 120a-120N, under the domain of the root/master node housing the first processor. The second processor can also be a specific processor within (or remote from) the node of the first processor leveraged for multiprocessing.

Once the request is received, the second processor can execute the first natural language task based at least in part on the data structure to produce a first task output (step 410). The first task output can then be inserted into the data structure (step 412), and the second processor can transmit the data structure having the first task output to the first processor (step 414). Finally, the first processor can generate an output based at least in part on the data structure and the desired output request (step 416). This output can be returned to the initiator (e.g., the user operating on client interface 106) and/or stored within database 120. In some cases, the output can be transmitted as a JavaScript Object Notation (JSON) object, although techniques for transmitting the output are contemplated.

Figure 5A:
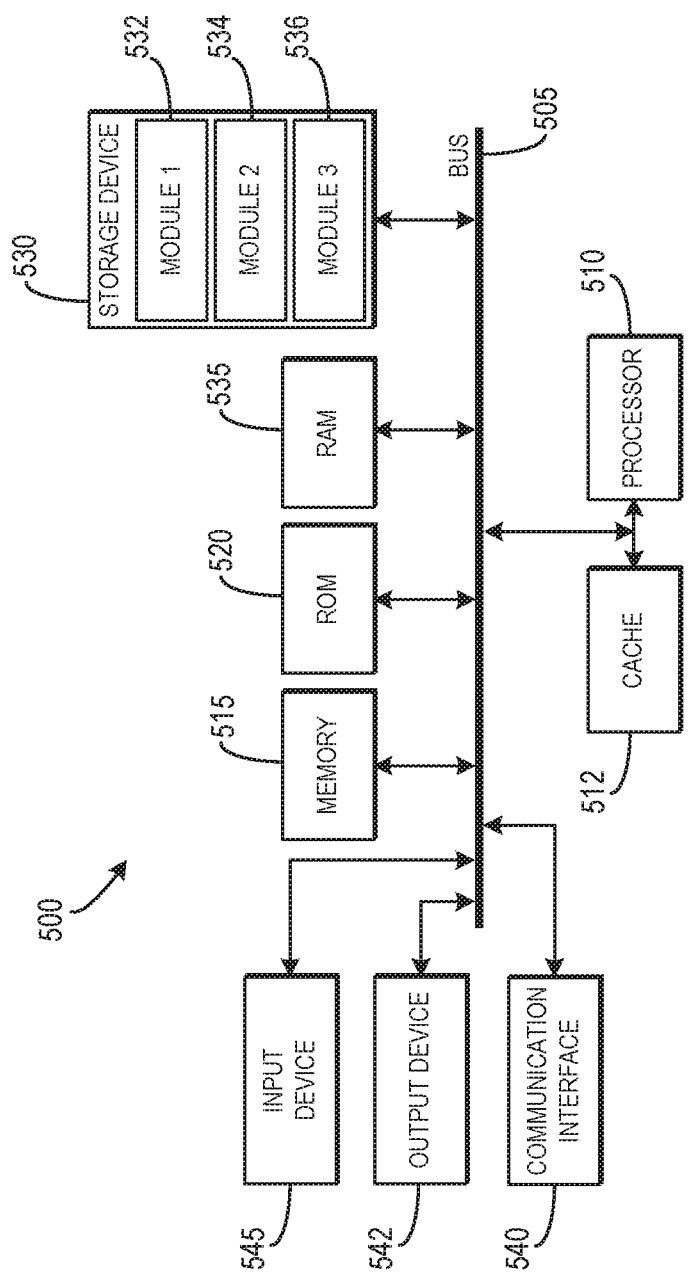
FIGS. 5A and 5B illustrate schematic diagrams of exemplary computing systems for use with the present disclosure.
Figure 5B:
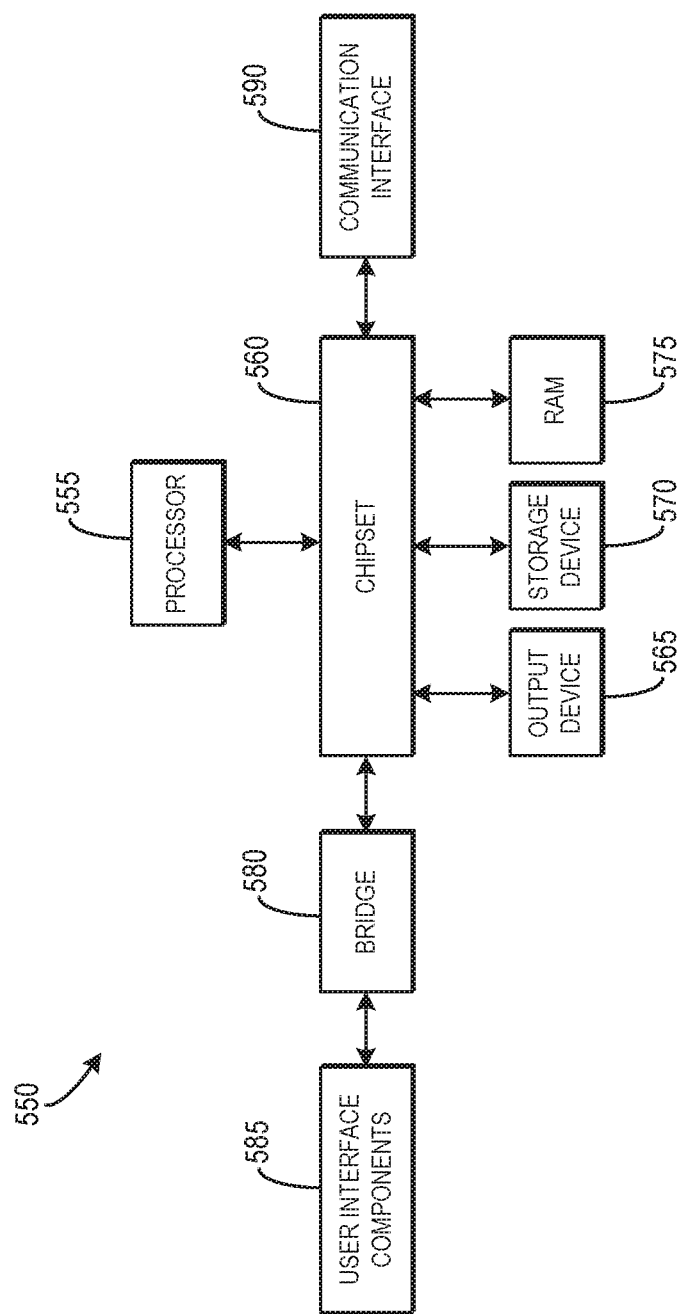

FIG. 5A and FIG. 5B illustrate example computing devices for use with example system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. System 500 can include a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 (532), module 2 (534), and module 3 (536) stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 542 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, output device 542, and so forth, to carry out the function.

FIG. 5B illustrates an example computer system 550 having a chipset architecture that can be used in executing the described method and generating and displaying a graphical user interface (GUI). Computer system 550 can be computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. Chipset 560 can output information to output device 565, such as a display, and can read and write information to storage device 570, which can include magnetic media, and solid state media. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that systems 500 and 550 can have more than one processor 510 or be part of a group or cluster of computing devices networked together to provide greater processing capability.

Methods according to the aforementioned description can be implemented using computer-executable instructions that are stored or otherwise available from computer readable media. Such instructions can comprise instructions and data which cause or otherwise configure a general purpose computer, special purpose computer, or special purpose processing device to perform a certain function or group of functions. Portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

For clarity of explanation, in some instances the present technology may be presented as including individual functional blocks including functional blocks comprising devices, device components, steps or routines in a method embodied in software, or combinations of hardware and software.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in these disclosures.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims. Moreover, claim language reciting "at least one of" a set indicates that one member of the set or multiple members of the set satisfy the claim.

What is claimed is:

1. A method comprising:
   receiving, by a first processor, a natural language input, the natural language input including a raw text document and a desired output request;
   defining, by the first processor, an ordered sequence of natural language tasks based at least in part on the raw text document and the desired output request;
   generating, by the first processor, a data structure, the data structure including a first property consisting of the raw text document; and
   transmitting, by the first processor to a second processor, the data structure and a request to execute a first natural language task in the ordered sequence comprising:
      executing, as a first step and by the second processor, the first natural language task based at least in part on the data structure to produce a first task output;
      inserting, as a second step and by the second processor, a second property into the data structure, the second property including the first task output;
      transmitting, as a third step and by the second processor to the first processor, the data structure having the first property consisting of the raw text document and the second property including the first task output; and
      generating, as a fourth step and by the first processor, an output based at least in part on the data structure and the desired output request;
   wherein the first processor and the second processor comprise a natural language processing (NLP) engine.

2. The method of claim 1, wherein the first processor is housed within a first computing node remotely located from the second processor housed within a second computing node.

3. The method of claim 2, wherein the first computing node and the second computing node comprise a node cluster, and wherein the first computing node is configured as a master node and the second computing node is configured as a slave node.

4. The method of claim 1, wherein the first processor and the second processor are located within the first computing node and are configured for multiprocessing.

5. The method of claim 1, wherein the first natural language task comprises one of a sentence segmentation, a word tokenization, a part of speech tagging, a named entity recognition, or a relation extraction.

6. The method of claim 1, wherein the data structure further comprises configuration options for one or more tasks within the ordered sequence of natural language tasks.

7. The method of claim 1, further comprising:
transmitting, by the first processor to the second processor, the data structure having the first property consisting of the raw text document and the second property including the first task output and a request to execute a second natural language task in the ordered sequence;
executing, by the second processor, the second natural language task to produce a second task output, wherein the first task output serves as an input to the second natural language task; and
inserting, by the second processor, a third property into the data structure, the third property including the second task output.

8. The method of claim 1, further comprising:
providing, by the first processor and to a user computing device, an application configured to display an interactive user interface for entering the natural language input.

9. The method of claim 7, further comprising:
transmitting, by the first processor and to the user computing device, the output; and
displaying, by the application on the user computing device, an interactive visualization of the output.

10. The method of claim 8, wherein the output is transmitted as a JavaScript Object Notation (JSON) object.

11. The method of claim 1, wherein the raw text document comprises unstructured text pertaining to one or more of a medical device, drug brand, and drug compound.

12. A system, comprising:
a natural language processing (NLP) engine comprising a first processor and a second processor; and
a computer-readable non-transitory storage medium having stored therein instructions which, when executed by the NLP engine, cause the NLP engine to perform operations comprising:
receiving, by the first processor, a natural language input, the natural language input including a raw text document and a desired output request;
defining, at the first processor, an ordered sequence of natural language tasks based at least in part on the raw text document and the desired output request;
generating, at the first processor, a data structure, the data structure including a first property consisting of the raw text document; and
performing the ordered sequence comprising:
executing, as a first step at the second processor, the first natural language task based at least in part on the data structure to produce a first task output;
inserting, as a second step at the second processor, a second property into the data structure, the second property including the first task output;
transmitting, as a third step and to the first processor, the data structure having the first property consisting of the raw text document and the second property including the first task output; and
generating, as a fourth step at the first processor, an output based at least in part on the data structure and the desired output request.

* * * * *